United States Patent
Kim et al.

(10) Patent No.: US 12,517,953 B2
(45) Date of Patent: Jan. 6, 2026

(54) KEYWORD DATA LINKING SYSTEM AND METHOD THEREOF

(71) Applicant: JNPMEDI INC., Incheon (KR)

(72) Inventors: Min Seok Kim, Incheon (KR); Young Yong Park, Incheon (KR)

(73) Assignee: JNPMEDI INC., Incheon (KR)

( * ) Notice: Subject to any disclaimer, the term of this patent is extended or adjusted under 35 U.S.C. 154(b) by 10 days.

(21) Appl. No.: 17/981,622

(22) Filed: Nov. 7, 2022

(65) Prior Publication Data

US 2023/0195790 A1 Jun. 22, 2023

(30) Foreign Application Priority Data

Dec. 16, 2021 (KR) ........................ 10-2021-0180610

(51) Int. Cl.
*G06F 15/16* (2006.01)
*G06F 16/84* (2019.01)

(52) U.S. Cl.
CPC .................................... *G06F 16/84* (2019.01)

(58) Field of Classification Search
None
See application file for complete search history.

(56) References Cited

U.S. PATENT DOCUMENTS

| | | | | |
|---|---|---|---|---|
| 9,418,315 B1 * | 8/2016 | Keogh | ................ | G06V 30/412 |
| 2010/0325109 A1 * | 12/2010 | Bai | ...................... | G06F 16/951 |
| | | | | 707/E17.089 |
| 2010/0332525 A1 * | 12/2010 | Gildred | ............... | H04N 1/0044 |
| | | | | 707/769 |
| 2013/0263092 A1 * | 10/2013 | Chikahisa | ........... | G06F 11/3624 |
| | | | | 717/126 |
| 2014/0143224 A1 * | 5/2014 | Allawi | ................. | G06F 16/951 |
| | | | | 707/706 |
| 2015/0058320 A1 * | 2/2015 | Zheng | .................... | G06F 16/35 |
| | | | | 707/722 |
| 2017/0147540 A1 | 5/2017 | Mccormick et al. | | |
| 2018/0052934 A1 * | 2/2018 | Li | ....................... | G06F 16/5866 |
| 2020/0081972 A1 * | 3/2020 | Majumder | ........ | G06F 16/90344 |
| 2020/0097492 A1 * | 3/2020 | Keskar | .................. | G06F 16/381 |
| 2020/0293290 A1 * | 9/2020 | Miyauchi | ................. | G06F 8/10 |
| 2021/0149992 A1 | 5/2021 | Nam et al. | | |

FOREIGN PATENT DOCUMENTS

| | | | |
|---|---|---|---|
| JP | 2012-118822 A | | 6/2012 |
| JP | 2015-201024 A | | 11/2015 |

OTHER PUBLICATIONS

Joan Lambert, "Microsoft Word 2019 Step by Step," Microsoft Press, Apr. 2, 2019, vol. 19.

* cited by examiner

*Primary Examiner* — Alex Gofman
(74) *Attorney, Agent, or Firm* — Bridgeway IP Law Group, PLLC; Sang Ho Lee; Hyun Woo Shin

(57) ABSTRACT

Provided is a keyword data linking system and a method thereof, and a keyword data linking method according to an embodiment includes the steps of: defining at least one keyword area in a first document, by a platform; extracting, when a first user terminal inputs data into a first keyword area of the first document, the data as a keyword, by the platform; generating a keyword rule, by the platform; parameterizing the keyword into a variable, by the platform; and inputting, when the first user terminal inputs a variable name into a second keyword area of the first document, a keyword stored to be mapped to the variable name into the second keyword area, by the platform.

19 Claims, 4 Drawing Sheets

KEYWORD DATA LINKING SYSTEM AND METHOD THEREOF

CROSS-REFERENCE TO RELATED APPLICATION

This application claims priority to Korean Patent Application No. 10-2021-0180610, filed on Dec. 16, 2021, in the Korean Intellectual Property Office, the entire contents of which is hereby incorporated by reference.

BACKGROUND OF THE INVENTION

Field of the Invention

The present invention relates to a keyword data linking system and a method thereof, and more specifically, to a keyword data linking system and a method thereof, which can provide a linking function for extracting keyword data of a predefined area from any one among a plurality of related documents, and automatically inputting keywords when a plurality of documents is created.

Background of the Related Art

In modern society, it is easy to create, store, and transfer documents for processing business, and documents tend to be created and stored or shared in an electronic form to perform smooth joint business and non-contact business.

When a plurality of users creates related documents according to any one project, protocol, or the like, mismatch occurs in the terms of the documents, and accordingly, additional works may be required to confirm or match the terms of a plurality of related documents.

For example, as interest in health increases in the modern society, the number of clinical trials for developing new medicines rapidly increases, and documents used for the clinical trials tend to be digitized to easily manage the clinical trial data.

However, various documents such as clinical trial plans, informed consent forms (ICF), investigator's brochures (IB), case report forms (CRF), clinical study reports (CSR), and the like are created by a plurality of users in the process of the clinical trials. Therefore, those who create the documents suffer from inconvenience of matching the terms with reference to previously created documents in order to match the terms among the documents in the process of creating the clinical trial documents, and additional works are required to determine whether the terms match among a plurality of documents or to correct the documents when the terms mismatch.

SUMMARY OF THE INVENTION

Accordingly, the present invention has been made in view of the above-mentioned problems occurring in the prior art, and it is an object of the present invention to provide a keyword data linking system and a method thereof, which can match terms among a plurality of related documents by linking keywords among related documents and automatically inputting the keywords.

The technical problems of the present invention are not limited to the technical problems mentioned above, and unmentioned other technical problems will be clearly understood by those skilled in the art from the following description.

To accomplish the above object, according to an aspect of the present invention, there is provided a keyword data linking method comprising the steps of: defining at least one keyword area in a first document, by a platform; extracting, when a first user terminal inputs data into a first keyword area of the first document, the data as a keyword, by the platform; generating a keyword rule, by the platform; parameterizing the keyword into a variable, by the platform; and inputting, when the first user terminal inputs a variable name into a second keyword area of the first document, a keyword stored to be mapped to the variable name into the second keyword area, by the platform.

The step of parameterizing the keyword into a variable by the platform may include the steps of: parameterizing the keyword into a variable according to the keyword rule, and mapping and storing the keyword and a variable name of the parameterized keyword.

The step of generating a keyword rule by the platform may include the steps of: providing at least one variable name generation rule to the first user terminal, by the platform; and receiving selection of any one of the at least one variable name generation rule from the first user terminal, by the platform.

The step of generating a keyword rule by the platform may include the step of receiving a variable name for the keyword from the first user terminal, by the platform.

The step of generating a keyword rule by the platform may be performed before the step of defining at least one keyword area in a first document by a platform, and may include the step of receiving at least one keyword to be used in a plurality of related documents including the first document and a variable name corresponding to the at least one keyword, by the platform.

The keyword data linking method may further comprise the step of, when a second user terminal inputs the variable name into a third keyword area of a second document, which is a document related to the first document, through the platform, inputting the keyword stored to be mapped to the variable name into the third keyword area, by the platform.

According to an embodiment of the present invention, there is provided a platform for linking keyword data of a plurality of related documents, the platform includes: a document creation unit for providing a template for creating a document to a user terminal and defining at least one keyword area in each of the plurality of related documents; a document editing unit for providing any one among the plurality of related documents generated by the document generation unit to the user terminal; and a keyword management unit for extracting and parameterizing data input into a first keyword area of a first document among the plurality of related documents into a variable in association with the document creation unit and the document editing unit, and inputting, when the user terminal inputs a variable name into a second keyword area of a second document among the plurality of related documents, the keyword stored to be mapped to the variable name into the second keyword area.

The keyword management unit may include a rule generation unit for generating a keyword rule to be used in the plurality of related documents.

The rule generation unit may provide at least one variable name generation rule to the first user terminal, and generate the keyword rule according to any one variable name generation rule selected by the user terminal.

The rule generation unit may receive a variable name corresponding to the keyword from the user terminal.

The rule generation unit may receive at least one keyword to be used in the plurality of related documents and a variable name corresponding to the at least one keyword from the user terminal.

The keyword management unit may further include a keyword conversion unit for parameterizing the keyword into a variable according to the keyword rule, and storing the keyword mapped to the variable name of the parameterized keyword.

The keyword management unit may further include a keyword extraction unit for extracting the data input into the first keyword area as a keyword and providing the keyword to the keyword conversion unit.

The keyword management unit may further include a keyword input unit for receiving, when a variable name is input into the second keyword area by the user terminal, a keyword call including the variable name from the document creation unit or the document editing unit, and inputting the keyword stored to be mapped to the variable name into the second keyword area.

The document editing unit may provide, when the input area of the user terminal enters at least one keyword area defined in each of the plurality of related documents, a keyword list including a plurality of variable names previously stored in the user terminal and a plurality of keywords respectively mapped to the plurality of variable names.

Details of other embodiments are included in the detailed description and drawings.

According to the keyword data linking system and a method thereof according to the embodiments, as keywords are linked to each other among related documents and automatically input to match the terms among a plurality of related documents, a plurality of users who creates a plurality of related documents may easily and conveniently create the documents to have standardized terms.

In addition, according to the keyword data linking system and a method thereof according to the embodiments, as additional works are not required to determine whether the terms match among a plurality of documents or to correct the documents when the terms mismatch, it may be advantageous to reduce the amount of work.

The effects according to the embodiments of the present invention are not limited by the contents exemplified above, and more various effects are included in this specification.

DETAILED DESCRIPTION OF THE PREFERRED EMBODIMENT

Figure 1:
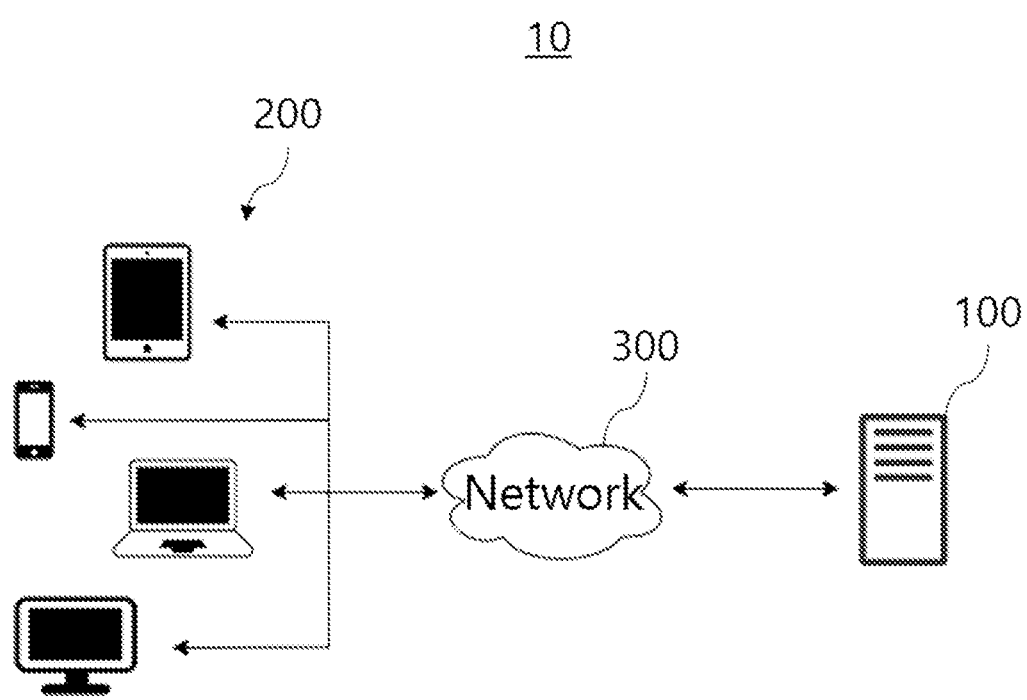
FIG. 1 is a schematic view showing a keyword data linking system according to an embodiment.

Hereinafter, preferred embodiments of the present invention will be described in detail with reference to the accompanying drawings in order to clarify the technical spirit of the present invention. In describing the present invention, when it is determined that detailed description of a related well-known function or component may unnecessarily obscure the gist of the present invention, the detailed description will be omitted. Components having substantially the same functional configuration in the drawings are given the same reference numerals and reference symbols as much as possible even though they are shown in different drawings. For convenience of explanation, the device and the method will be described together if necessary.

Although first, second, and the like are used to describe various components, it is apparent that these components are not limited by these terms. These terms are used only to distinguish one component from another. Accordingly, it goes without saying that a first component mentioned below may be a second component within the spirit of the present invention.

Hereinafter, the term "unit" is defined herein as having its broadest definition to ordinary skill in the art to refer to software including instructions executable in a non-transitory computer-readable medium that would perform the associated function when executed, a circuit or a processor designed to perform the associated function, hardware designed to perform the associated function, or a combination of them.

FIG. 1 is a schematic view showing a keyword data linking system according to an embodiment.

Referring to FIG. 1, a keyword data linking system 10 according to an embodiment may include a platform 100, a plurality of user terminals 200, and a network 300.

The platform 100 provides a document creation service and a document template for creating documents to a plurality of user terminals 200, and when the plurality of user terminals 200 creates documents, the platform 100 may link keywords among related documents to be automatically input. Here, the related document may mean documents classified into one set according to any one project or protocol.

For example, the platform 100 may extract and parameterize a keyword input into a specific area of a first document created by a first user terminal 200 into a variable, and store the keyword to be mapped to a variable name (or identifier). When a second user terminal 200 creates a second document related to the first document and calls the parameterized keyword, the platform 100 may provide a keyword data linking function for automatically inputting the keyword.

Hereinafter, although it will be described, for convenience of explanation, mainly focusing on that the platform 100 provides a keyword data linking function when two related documents are created by any one user terminal 200, it is not limited thereto. For example, the platform 100 may provide a keyword data linking function for linking keyword data among a plurality of related documents to a plurality of user terminals 200 when each of the plurality of user terminals 200 creates at least one among the related documents.

In addition, although a plurality of documents related by any one clinical trial protocol (e.g., clinical trial plan, informed consent form, investigator's brochure, case report form, clinical study report, etc.) will be described as specific examples of the related documents, it is not limited thereto.

The platform 100 is provided as a computerized system, and may provide a document creation service, a template for creating documents, and a keyword data linking function for linking keyword data among related documents to the plurality of user terminals 200 through at least one among, for example, an application program, an application, and a website. Details of the platform 100 will be described below with reference to FIG. 2.

The plurality of user terminals 200 may be devices capable of connecting to the platform 100 through a wired/wireless communication network such as the Internet and/or an intranet. For example, each of the plurality of user terminals 200 may be a mobile terminal such as a notebook computer, a handheld device, a smart phone, a tablet PC, or the like, a desktop computer, or any device using such devices or directly or indirectly connected thereto.

The plurality of user terminals 200 may be terminals of a plurality of users who creates a plurality of related documents through the platform 100. As a specific example, each of the plurality of user terminals 200 may be a terminal of any one among an institution, a corporation, a company, and an individual related to a clinical trial. For example, although each of the plurality of user terminals 200 may be a terminal of any one among a data manager (DM), a clinical trial manager, a clinical trial project manager (PM), and a clinical research associate (CRA) who manage and support information on the entire clinical trial process, or a terminal of any one among a clinical research coordinator (CRC), a study coordinator (SC), and a research nurse who conduct clinical trials and input clinical trial data, it is not limited thereto.

The network 300 is a communication network in which the platform 100 and the plurality of user terminals 200 communicate with each other, and may be configured regardless of a communication type. For example, although the network 300 may be configured of various communication networks such as a Personal Area Network (PAN), a Local Area Network (LAN), a Metropolitan Area Network (MAN), a Wide Area Network (WAN), and the like, it is not limited thereto.

Figure 2:
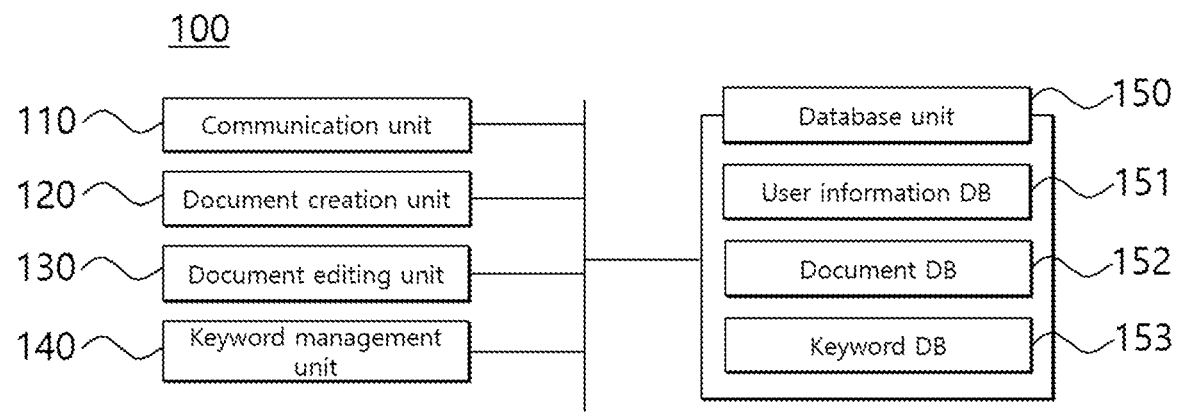
FIG. 2 is a block diagram schematically showing the configuration of a platform according to an embodiment.

FIG. 2 is a block diagram schematically showing the configuration of a platform according to an embodiment.

Referring to FIG. 2, the platform 100 may include a communication unit 110, a document creation unit 120, a document editing unit 130, a keyword management unit 140, and a database unit 150.

The communication unit 110 may exchange data with the plurality of user terminals 200 by wire or wirelessly through the network 300. The communication unit 110 may transmit and receive data between the platform 100 and the plurality of user terminals 200 through a wired Internet communication method that supports Transmission Control Protocol/Internet Protocol (TCP/IP) or the like, or at least any one among various wireless communication methods such as Wideband Code Division Multiple Access (WCMDA), Long Term Evolution (LTE), Wireless Broadband Internet (WiBro), Wireless Fidelity (Wi-Fi), and the like.

The document creation unit 120 may provide a template for creating documents to the user terminal 200. The document creation unit 120 may provide the template to the user terminal 200 through at least any one among an application program, an application, and a website. The document creation unit 120 may provide a plurality of templates stored according to document types to the user terminal 200.

For example, the document creation unit 120 may provide the user terminal 200 with a template for each of various types of documents, such as a clinical trial plan, an informed consent form, an investigator's brochure, a case report form, a clinical study report, and the like. Accordingly, the user terminal 200 may select any one among the plurality of templates provided by the document creation unit 120 to create a document.

The document creation unit 120 may provide a keyword area setting function to the user terminal 200. The user terminal 200 may set at least one keyword area from which a keyword may be extracted when a document is created. For example, when a document is created through the document creation unit 120, the user terminal 200 may set an area for inputting a keyword common to related documents.

Although the user terminal 200 may use parentheses to set a keyword area, it is not limited thereto. A method of the user terminal 200 for setting a keyword area when a document is created may be accomplished by various methods such as underlining and highlighting provided by the document creation unit 120. Accordingly, the document creation unit 120 may define a keyword area set by the user terminal 200 in a corresponding document as a keyword area of the document.

Furthermore, the keyword area setting function provided by the document creation unit 120 may include a function of setting a display format of an input keyword when a keyword is input into a corresponding keyword area.

For example, when a keyword area is set, the user terminal 200 may set a keyword display format including a size, a thickness, and whether or not italicized of a keyword to be input. When a plurality of keyword areas is set in any one document, the user terminal 200 may set a keyword display format for each of the plurality of keyword areas, but it is not limited thereto, and a keyword display format commonly applied to the plurality of keyword areas may be set.

In some embodiments, when the user terminal 200 sets the keyword area through the document creation unit 120, the user terminal 200 may input a keyword into the keyword area. The document creation unit 120 may be associated with the keyword management unit 140.

In addition, the document creation unit 120 may provide a keyword call function to the user terminal 200. The keyword call function may be a function of calling a previously stored keyword in order to input a keyword common to related documents into the keyword area of a document.

For example, the user terminal 200 may set a keyword area through the document creation unit 120, and call a keyword corresponding to the variable name from the keyword management unit 140 when a variable name (or identifier) is input in the keyword area. In this case, the document creation unit 120 may provide the variable name input by the user terminal 200 to the keyword managing unit 140.

When creation of a document is completed by the user terminal 200, the document creation unit 120 may store the completed document in the database unit 150. Although the document creation unit 120 may receive document information from the user terminal 200 and store the document by classifying the document according to the received information, it is not limited thereto. In this specification, the document information is information for managing related documents, and may include a clinical trial name, a document type, an identification code, and the like. However, it is not limited thereto.

The document editing unit 130 may provide the document generated and stored by the document creation unit 120 to the user terminal 200. The user terminal 200 may input data into the keyword area set in the corresponding document and/or an area left blank in the corresponding document through the document editing unit 130. In this case, the document editing unit 130 may edit the document in association with the keyword management unit 140.

The document editing unit 130 may provide a keyword call function to the user terminal 200. For example, when the user terminal 200 inputs a variable name in the keyword area, the document editing unit 130 may call a keyword corresponding to the variable name from the keyword management unit 140. In this case, the document editing unit 130 may provide the variable name input by the user terminal 200 to the keyword management unit 140.

In some embodiments, when the input area of the user terminal 200 enters the keyword area, the document editing unit 130 may provide a plurality of previously stored variable names and a list of keywords respectively corresponding to the plurality of variable names to the user terminal 200. For example, the document editing unit 130 may provide a keyword list including a plurality of variable names and a plurality of keywords corresponding thereto to the user terminal 200 in various methods such as a pop-up window and a drop-down user interface (UI).

The keyword management unit 140 may be associated with the document creation unit 120 and the document editing unit 130 to extract and parameterize a keyword into a variable, and store the keyword to be mapped to a variable name (or identifier). In addition, the keyword management unit 140 may input a keyword corresponding to a variable name in response to a keyword call received from the document editing unit 130.

Figure 3:
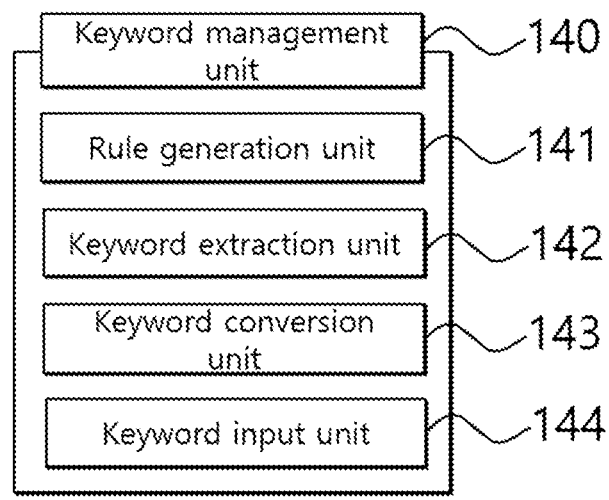
FIG. 3 is a block diagram schematically showing the configuration of a keyword management unit according to an embodiment.

FIG. 3 is a block diagram schematically showing the configuration of the keyword management unit 150 according to an embodiment.

Referring to FIG. 3, the keyword management unit 140 may include a rule generation unit 141, a keyword extraction unit 142, a keyword conversion unit 143, and a keyword input unit 144.

The rule generation unit 141 may generate keyword rules to be used in a plurality of related documents. Here, the keyword rule may be a variable name generation rule corresponding to each extracted keyword.

The rule generation unit 141 may provide a plurality of variable name generation rules to the user terminal 200. For example, the user terminal 200 may select any one among a plurality of variable name generation rules and at least one among a plurality of keyword display formats provided by the rule generation unit 141. Here, the variable name generation rule may include any one among arbitrary letters, numerals, or a combination of letters and numerals. However, it is not limited thereto.

The rule generation unit 141 may receive a plurality of variable names from the user terminal 200. The rule generation unit 141 may receive a plurality of variable names to be used in a corresponding project or protocol from the user terminal 200 for each project or protocol.

For example, when the user terminal 200 inputs data through the document editing unit 130, the rule generation unit 141 may receive a variable name from the user terminal 200. When the user terminal 200 inputs a keyword into the keyword area set in the document, the rule generation unit 141 may request the user terminal 200 to input a variable name corresponding to the keyword. In this case, although the rule generation unit 141 may request the user terminal 200 to select a keyword display format, together with a request to input a variable name, it is not limited thereto.

As another example, when the user terminal 200 inputs data through the document creation unit 120, the rule generation unit 141 may receive a variable name from the user terminal 200. When the user terminal 200 sets a keyword area and inputs a keyword into the keyword area, the rule generation unit 141 may request the user terminal 200 to input a variable name corresponding to the keyword.

The rule generation unit 141 may generate a keyword rule for a plurality of keywords or a keyword rule for each of the plurality of keywords according to selection or input of the user terminal 200, and apply the generated keyword rule to the keyword conversion unit 143. When the rule generation unit 141 provides the keyword rule to the keyword conversion unit 143, it may provide document information of a document for which the keyword rule is set to the keyword conversion unit 143, but it is not limited thereto.

The keyword extraction unit 142 may extract data input into the keyword area. For example, when the user terminal 200 inputs a keyword into the keyword area through the document editing unit 130, the keyword extraction unit 142 may extract the keyword input into the keyword area.

In addition, when the user terminal 200 sets a keyword area through the document creation unit 120 and inputs a keyword into the set keyword area, the keyword extraction unit 142 may extract the keyword input into the keyword area.

When the keyword input into the keyword area is a plurality of words, the keyword extraction unit 142 may extract the plurality of words as one keyword. However, it is not limited thereto, and the keyword extraction unit 142 may specifically extract each of the plurality of words as an individual keyword. To this end, when a keyword area is set through the document creation unit 120, the user terminal 200 may set a keyword extraction method of the keyword extraction unit 142.

The keyword extraction unit 142 may provide the extracted keyword to the keyword conversion unit 143. When the keyword extraction unit 142 extracts and provides a keyword to the keyword conversion unit 143, document information of a document from which the keyword is extracted may be provided to the keyword conversion unit 143, but it is not limited thereto.

The keyword conversion unit 143 may parameterize the keyword into a variable and store the keyword mapped to a variable name in the database unit 150. The keyword conversion unit 143 may store the keyword rule received from the rule generation unit 141. For example, the keyword conversion unit 143 may store a plurality of keywords by classifying the keywords according to the document information received from the rule generation unit 141.

When the keyword conversion unit 143 receives a keyword from the keyword extraction unit 142, it may generate and store a variable name according to document information and a keyword rule corresponding to the keyword.

The keyword input unit 144 may automatically input a keyword into a document in association with the document creation unit 120 and/or the document editing unit 130. For example, the keyword input unit 144 may receive a keyword call including a variable name from the document creation unit 120 and/or the document editing unit 130, confirm a previously stored keyword matching the variable name, and input the previously stored keyword into a target keyword area.

As described above, in the case of using the keyword management unit 140 according to an embodiment, as the user terminal 200 parameterizes and stores a keyword repeatedly used when related documents are created, and automatically inputs a keyword matching thereto when a variable name is input thereafter, a document may be simply created by omitting a procedure such as confirming terms, and terms of related documents may be easily matched.

Referring to FIG. 2 again, the database unit 150 may store user information of the user terminal 200, documents created by the document creation unit 120, documents edited by the document editing unit 130, keywords extracted by the keyword managing unit 140, data such as variable names mapped to the keywords, and the like. The database unit 150 according to an embodiment may include a user information DB 151, a document DB 152, and a keyword DB 153.

The user information DB 151 may store and manage user information of each of the plurality of user terminals 200. For example, the user information may include an email, an ID, affiliation information, a connection or access right, and the like of a user for connecting to any one among an application program, an application, and a website provided by the platform 100. In addition, the user DB 151 may store document information, title, creation or editing date and time of documents created by each user terminal 200.

The document DB 152 may store and manage documents created by the document creation unit 120 and documents edited to include input data by the document editing unit 130. For example, the document DB 152 may classify each document according to document information and create, store, and manage a directory of related documents.

The keyword DB 153 may store and manage keywords, variable names corresponding to the keywords, and keyword display formats as one keyword-related information by mapping them each other. When a plurality of pieces of keyword-related information is stored and managed, the keyword DB 153 may store and manage the keyword-related information by classifying the keyword-related information according to document information corresponding to each keyword-related information.

As described above, when a function of creating a plurality of related document included in any one project or protocol is provided, as the platform 100 according to an embodiment parameterizes and stores a keyword to be used in the related documents, and automatically inputs a keyword corresponding to a variable name input by the user terminal 200, a plurality of users who creates a plurality of related documents may easily and conveniently create the documents to have standardized terms.

In addition, as additional works are not required to determine whether the terms match among a plurality of documents or to correct the documents when the terms mismatch, it may be advantageous to reduce the amount of work.

Figure 4:
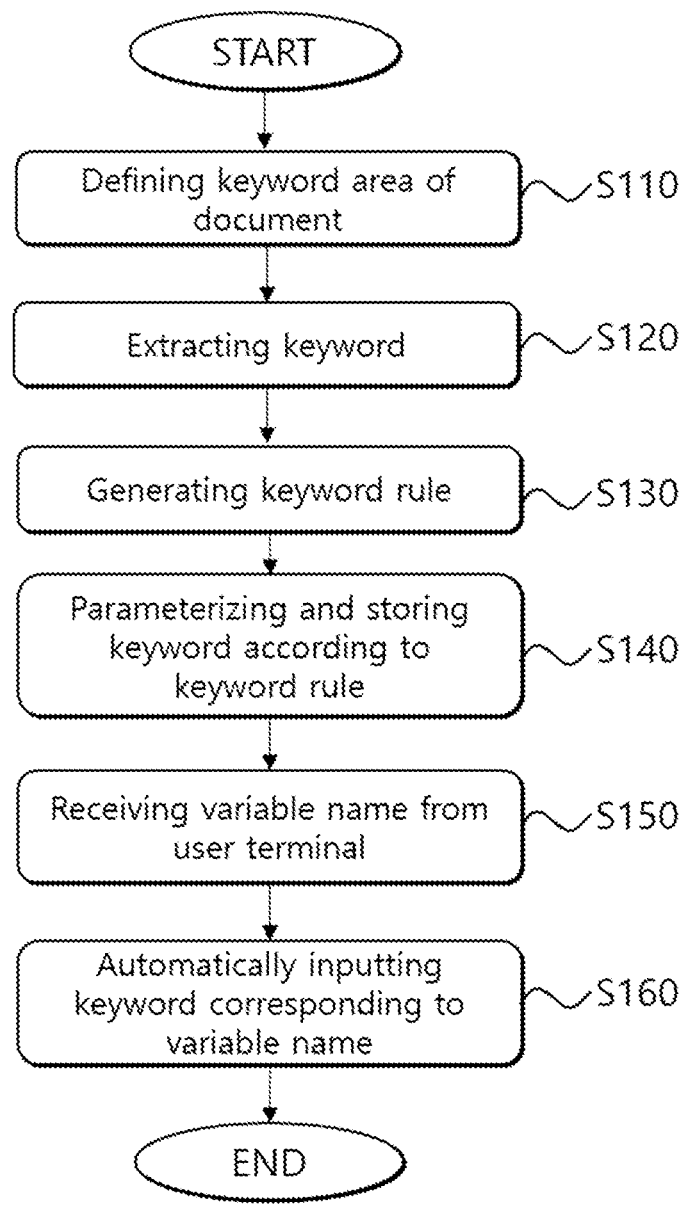
FIG. 4 is a flowchart illustrating a keyword data linking method of a platform according to an embodiment.

FIG. 4 is a flowchart illustrating a keyword data linking method of a platform according to an embodiment.

Referring to FIGS. 1 to 4, first, the platform 100 defines a keyword area of a document (S110).

When the document creation unit 120 provides a template for creating documents to the user terminal 200, the user terminal 200 may set at least one keyword area from which a keyword is extracted when a document is created.

Although the user terminal 200 may use parentheses to set a keyword area, it is not limited thereto. For example, the user terminal 200 may set a keyword area using any one among various methods such as underlining and highlighting provided by the document creation unit 120.

Accordingly, the document creation unit 120 may define a keyword area set by the user terminal 200 in a corresponding document as the keyword area of the document. Any one document may include a plurality of keyword areas.

In addition, when a keyword area is set, the user terminal 200 may set a keyword display format including a size, a thickness, and whether or not italicized of a keyword to be input. When a plurality of keyword areas is set in any one document, the user terminal 200 may set a keyword display format for each of the plurality of keyword areas, but is not limited thereto, and a keyword display format commonly applied to the plurality of keyword areas may be set.

Thereafter, the platform 100 extracts a keyword (S120).

When the user terminal 200 inputs data into at least one keyword area included in the document, the keyword extraction unit 142 may extract the data input into the keyword area. For example, when the user terminal 200 inputs a keyword into the keyword area through the document editing unit 130, the keyword extraction unit 142 may extract the keyword input into the keyword area.

In addition, when the user terminal 200 sets a keyword area through the document creation unit 120 and inputs a keyword into the set keyword area, the keyword extraction unit 142 may extract the keyword input into the keyword area.

When the keyword input into the keyword area is a plurality of words, the keyword extraction unit 142 may extract the plurality of words as one keyword. However, it is not limited thereto, and the keyword extraction unit 142 may designate and extract each of the plurality of words as an individual keyword. To this end, when a keyword area is set through the document creation unit 120, the user terminal 200 may set a keyword extraction method of the keyword extraction unit 142.

The keyword extraction unit 142 may provide the extracted keyword to the keyword conversion unit 143. When the keyword extraction unit 142 extracts a keyword and provides it to the keyword conversion unit 143, document information of the document from which the keyword is extracted may be provided to the keyword conversion unit 143, but it is not limited thereto.

Next, the platform 100 generates a keyword rule (S130).

The rule generation unit 141 may generate a keyword rule to be used in a plurality of related documents including documents generated by the document generation unit 120. Here, the keyword rule may mean a variable name generation rule corresponding to each extracted keyword.

The rule generation unit 141 may provide a plurality of variable name generation rules to the user terminal 200. For example, the user terminal 200 may select any one among a plurality of variable name generation rules provided by the rule generation unit 141. Here, the variable name generation rule may include any one among arbitrary letters, numerals, or a combination of letters and numerals. However, it is not limited thereto.

The rule generation unit 141 may receive a plurality of variable names from the user terminal 200. The rule generation unit 141 may receive a plurality of variable names to be used in a corresponding project or protocol from the user terminal 200 for each project or protocol.

For example, when the user terminal 200 inputs data through the document editing unit 130, the rule generation unit 141 may receive a variable name from the user terminal 200. When the user terminal 200 inputs a keyword into the keyword area set in the document, the rule generation unit 141 may request the user terminal 200 to input a variable name corresponding to the keyword. In this case, although the rule generation unit 141 may request the user terminal 200 to select a keyword display format, together with a request to input a variable name, it is not limited thereto.

As another example, when the user terminal 200 inputs data through the document creation unit 120, the rule generation unit 141 may receive a variable name from the user terminal 200. When the user terminal 200 sets a keyword area and inputs a keyword into the keyword area, the rule generation unit 141 may request the user terminal 200 to input a variable name corresponding to the keyword.

The rule generation unit 141 may generate a keyword rule for a plurality of keywords or a keyword rule for each of the plurality of keywords according to selection or input of the user terminal 200, and apply the generated keyword rule to the keyword conversion unit 143. When the rule generation unit 141 provides the keyword rule to the keyword conversion unit 143, it may provide document information of a document for which a keyword rule is set to the keyword conversion unit 143, but it is not limited thereto.

Although FIG. 4 illustrates that the step of generating a keyword rule to be used in a plurality of related documents by the rule generation unit 141 is performed after the step of defining a keyword area (S110) and the step of extracting a keyword (S120), it is not limited thereto.

For example, the rule generation unit 141 may provide a separate keyword rule generation function before the user terminal sets a keyword area through the document creation unit 120 or before the user terminal inputs data into the keyword area through the document creation unit 120 and/or the document editing unit 130. In this case, the rule generation unit 141 may provide a table for inputting a keyword to be used in a plurality of related documents and a variable name corresponding to the keyword to the user terminal 200 in the form of a pop-up window. However, it is not limited thereto, and a method of the rule generation unit 141 for receiving at least one keyword and a variable name corresponding to the keyword from the user terminal 200 may be implemented in various ways.

Then, the platform 100 parameterizes and stores the keyword according to the keyword rule (S140).

The keyword conversion unit 143 may parameterize the keyword into a variable and store the keyword mapped to a variable name in the database unit 150. The keyword conversion unit 143 may store the keyword rule received from the rule generation unit 141. For example, the keyword conversion unit 143 may store a plurality of keywords by classifying the keywords according to the document information received from the rule generation unit 141.

When the keyword conversion unit 143 receives a keyword from the keyword extraction unit 142, it may generate and store a variable name according to document information and a keyword rule corresponding to the keyword.

Finally, the platform 100 receives the variable name from the user terminal 200 (S150), and automatically inputs a keyword corresponding to the received variable name (S160).

The keyword input unit 144 may automatically input a keyword into a document in association with the document creation unit 120 and/or the document editing unit 130.

For example, when the user terminal 200 inputs a variable name into the keyword area of the document through the document creation unit 120 or the document editing unit 130, the document creation unit 120 or the document editing unit 130 may call a keyword corresponding to the variable name from the keyword input unit 144.

Accordingly, the keyword input unit 144 may receive a keyword call including a variable name from the document creation unit 120 or the document editing unit 130, confirm a previously stored keyword matching the variable name, and input the previously stored keyword into a target keyword area.

Although FIG. 4 shows an example of setting a keyword area of a document, setting a keyword rule, inputting a keyword to be parameterized into the keyword area, and inputting a variable name into the keyword area by one user terminal 200 for convenience of explanation, it is not limited thereto, and each of the setting step and the inputting step may be performed by a plurality of user terminals 200.

As described above, in the case of using a keyword data linking method according to an embodiment, when a plurality of related documents included in any one project or protocol is created, as a keyword to be used in the related documents is parameterized and stored, and a keyword corresponding to a variable name input by the user terminal 200 is automatically input, a plurality of users who creates a plurality of related documents may easily and conveniently create the documents to have standardized terms.

In addition, as additional works are not required to determine whether the terms match among a plurality of documents or to correct the documents when the terms mismatch, it may be advantageous to reduce the amount of work.

Figure 5:
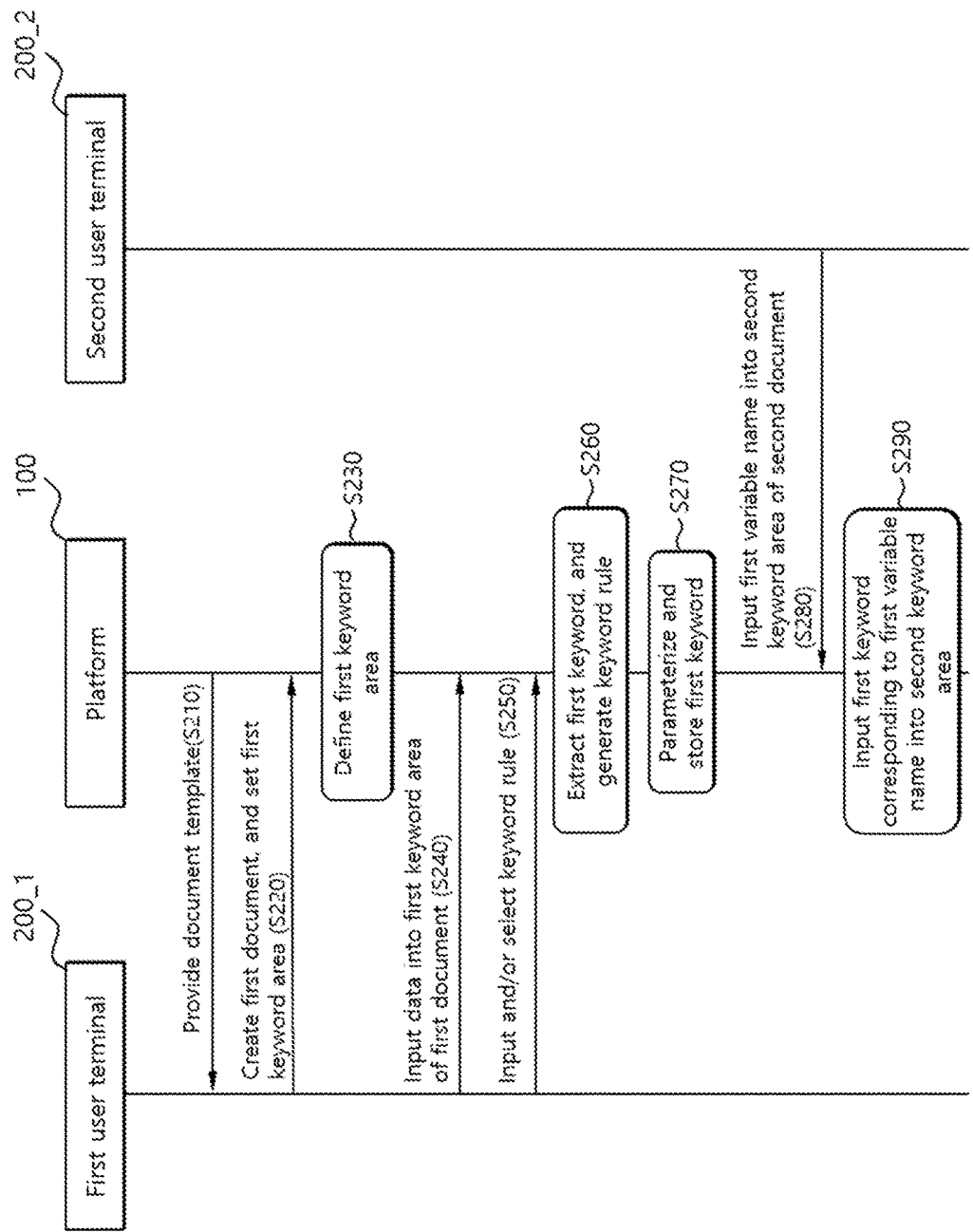
FIG. 5 is a sequence chart illustrating a method of providing a keyword data linking function for linking keyword data among a plurality of related documents to a plurality of user terminals according to an embodiment.

FIG. 5 is a sequence chart illustrating a method of providing a keyword data linking function for linking keyword data among a plurality of related documents to a plurality of user terminals according to an embodiment.

The embodiment of FIG. 5 is different from the embodiment of FIG. 4 in that the platform 100 provides a keyword data linking function for linking keyword data among a plurality of related documents to a plurality of user terminals 200_1 and 200_2. In FIG. 5, detailed descriptions overlapped with the embodiment of FIG. 4 will be omitted.

Referring to FIGS. 1 to 5, the platform 100 provides a document template to a first user terminal 200_1 (S210).

The document creation unit 120 may provide a template for creating documents to the first user terminal 200_1. The document creation unit 120 may provide the template to the first user terminal 200_1 through at least any one among an application program, an application, and a website. The document creation unit 120 may provide a plurality of templates stored according to document types to the first user terminal 200_1.

For example, the document creation unit 120 may provide the first user terminal 200_1 with a template for each of various types of documents, such as a clinical trial plan, an informed consent form, an investigator's brochure, a case report form, a clinical study report, and the like. Accordingly, the first user terminal 200_1 may select any one among the plurality of templates provided by the document creation unit 120 to create a first document.

The first user terminal 200_1 sets a first keyword area of the first document when the first document is created (S220), and the platform 100 defines the first keyword area of the first document (S230).

The method of setting the first keyword area of the first user terminal 200_1 and the process of defining the first keyword area of the platform 100 may be substantially the same as the method of setting a keyword area of the user terminal 200 and the process of defining a keyword of the document creation unit 120 described in FIG. 4.

Thereafter, the first user terminal 200_1 inputs data into the first keyword area of the first document (S240).

The process of inputting data into the first keyword area by the first user terminal 200_1 may be performed when the first document is created through the document creation unit 120 or when data is input into the first document through the document editing unit 130.

In addition, the first user terminal 200_1 inputs and/or selects a keyword rule (S250).

The rule generation unit 141 may provide a plurality of variable name generation rules to the first user terminal 200_1 to generate a keyword rule for the first keyword.

Accordingly, the first user terminal 200_1 may input a variable name of the first keyword or select a rule for generating a variable name of the first keyword.

Next, the platform 100 extracts the first keyword, generates a keyword rule of the first keyword (S260), and parameterizes and stores the first keyword according to the first keyword rule (S270).

Next, the second user terminal 200_2 may create a second document, which is a document related to the first document, through the platform 100 or may input data into a previously stored second document.

That is, the second document is a document created by the second user terminal 200_2 as a document related to the first document after receiving a document template from the platform 100, or a document created as a document related to the first document by another user terminal 200 including the second user terminal 200_2 or the first user terminal 200_1, and stored in the platform 100.

The second user terminal 200_2 inputs a first variable name into the second keyword area of the second document (S280). Here, the first variable name may be a variable name generated by parameterizing the first keyword into a variable by the keyword conversion unit 143.

When the second document is a document created by the second user terminal 200_2, the second keyword area may be any one of the keyword areas of the second document set by the second user terminal 200_2 and defined by the document creation unit 120.

In addition, when the second document is a document created by another user terminal 200 including the second user terminal 200_2 or the first user terminal 200_1 and stored in the platform 100, the second keyword area may be any one of the keyword areas of the second document set when another user terminal 200 including the second user terminal 200_2 or the first user terminal 200_1 creates the second document.

Finally, the platform 100 inputs the first keyword corresponding to the first variable name into the second keyword area (S290).

For example, when the second user terminal 200_2 creates the second document through the document creation unit 120, the document creation unit 120 may call a keyword corresponding to the first variable name input into the second keyword area from the keyword input unit 144.

As another example, when the second user terminal 200_2 is inputting data into the second document through the document editing unit 130, the document editing unit 130 may call a keyword corresponding to the first variable name input into the second keyword area from the keyword input unit 144.

The keyword input unit 144 may receive a keyword call including the first variable name from the document creation unit 120 or the document editing unit 130, and input the first keyword stored to be matched to the first variable name into the second keyword area of the second document (S290).

As described, in the case of using a method for linking keyword data among a plurality of related documents, as a keyword common to related documents is parameterized into a variable, and a keyword corresponding to a variable name is automatically input when the variable name is input, it may be advantageous to match the terms among a plurality of related documents. In addition, a plurality of users may easily and conveniently create a plurality of related documents or input data to have standardized terms.

Furthermore, in the case of using a method for linking keyword data among a plurality of related documents, as additional works are not required to determine whether the terms match among a plurality of documents or to correct the documents when the terms mismatch, it may be advantageous to reduce the amount of work.

Until now, the present invention has been described in detail with reference to the embodiments shown in the drawings. These embodiments are not intended to limit the present invention, but are merely illustrative, and should be considered in an illustrative rather than a restrictive sense. The true technical protection scope of the present invention should be determined by the technical spirit of the appended claims rather than the above description. Although specific terms are used in this specification, they are only used for the purpose of describing the concept of the present invention, and are not used to limit the meaning or the scope of the present invention described in the claims. Each step of the present invention does not need to be necessarily performed in the order described above, and may be performed in parallel, selectively, or individually. Those skilled in the art will understand that various modifications and equivalent other embodiments are possible without departing from the essential technical spirit of the present invention as claimed in the claims. It should be understood that equivalents include both currently known equivalents, as well as equivalents that will be developed in the future, i.e., all components invented to perform the same function, regardless of the structure.

DESCRIPTION OF SYMBOLS

10: Keyword data linking system
100: Platform
110: Communication unit
120: Document creation unit
130: Document editing unit
140: Keyword management unit
150: Database unit
141: Rule generation unit
142: Keyword extraction unit
143: Keyword conversion unit
144: Keyword input unit

What is claimed is:

1. A keyword data linking method comprising:
defining at least one keyword area in a first document, by a platform;
extracting, upon receipt of data from a first user terminal into a first keyword area of the at least one keyword area in the first document, the data as a keyword, by the platform;
generating at least one variable generation keyword rule, by the platform;
parameterizing the keyword into a variable name by mapping the keyword to the variable name according to the at least one variable generation keyword rule, by the platform;
automatically inputting, by the platform, the keyword stored and mapped to the variable name into a target keyword area of the first document when a first user inputs the variable name from the first-user terminal into the target keyword area via the first user terminal;
providing, by the platform, a keyword list, including a plurality of variable names which are classified and pre-stored in accordance with a plurality of related documents, and a plurality of keywords which are mapped to the plurality of variable names, to a second user terminal when a second user accesses a second keyword area of a second document via the second user terminal, wherein the second document is related to the first document; and automatically inputting, by the platform, the keyword stored and mapped to the variable name into the second keyword area of the second document when the second user inputs the variable name into the second keyword area via the second user terminal, wherein the keyword that is automatically input into the second keyword area is the data initially input into the first keyword area by the first user via the first user terminal, wherein the first user terminal and the second user terminal have an authority to generate the plurality of related documents through the platform, wherein the first and second documents are related to each other by a clinical trial protocol, wherein the platform wirelessly exchanges data with the first and second user terminals through a network, wherein the variable name is classified and stored in the platform according to document information of the first document, wherein the document information is for managing a plurality of related documents including the first and second documents, and wherein the parameterizing the keyword into the variable name by the platform includes:

classifying the plurality of keywords according to the document information and storing the keyword list, or generating and storing the variable name according to the document information and a keyword rule corresponding to an input keyword.

2. The keyword data linking method according to claim 1, wherein the parameterizing the keyword into the variable by the platform includes:

storing the keyword and the variable name by a parameterized keyword.

3. The keyword data linking method according to claim 1, wherein the generating the at least one variable generation keyword rule by the platform includes:

generating at least one variable name generation rule and providing the at least one variable name generation rule to the first user terminal, by the platform; and receiving selection of any one of the at least one variable name generation rule from the first user terminal, by the platform.

4. The keyword data linking method according to claim 1, wherein the generating the at least one variable generation keyword rule by the platform includes:

receiving the variable name for the keyword from the first user terminal to generate the at least one variable generation keyword rule, by the platform.

5. The keyword data linking method according to claim 1, wherein the generating the at least one variable generation keyword rule by the platform is performed before the defining the at least one keyword area in the first document by the platform, and includes receiving at least one keyword to be input in the plurality of related documents including the first and second documents and the variable name corresponding to the at least one keyword, by the platform.

6. The keyword data linking method according to claim 1, wherein the defining the at least one keyword area includes:

setting the at least one keyword area, by the first user terminal or the second user terminal, from which the keyword is extracted using a keyword area setting function;

providing a keyword display format setting function, by the platform, to at least one of the first user terminal or the second user terminal; and setting a keyword display format, by the first user terminal or the second user terminal, for the keyword when the keyword is inputted into the at least one keyword area, wherein the keyword display format predetermines a format of the keyword displayed on the plurality of related documents when inputted into the at least one keyword area.

7. The keyword data linking method of claim 1, wherein, when the keyword input into the target keyword area is a plurality of words, the plurality of words is collectively extracted as or a single string of keyword.

8. The keyword data linking method of claim 1, wherein, when the keyword input into the target keyword area is a plurality of words, each word of the plurality of words is extracted as a separate individual keyword.

9. A platform for linking keyword data of a plurality of related documents, the platform comprising:

a processor; and a memory, in which software is stored, the software for execution by the processor as computer-executable instructions, wherein the software includes:

a document creation unit configured to provide a template to a first user terminal and a second user terminal to create a document and to allow at least one of a first user and a second user to define at least one keyword area in each of the plurality of related documents;

a document editing unit configured to:

provide any one among the plurality of related documents generated by the document creation unit to the at least one of the first user terminal and the second user terminal, enable the at least one of the first user terminal and the second user terminal to input data into the keyword area and edit the document, and provide to the second user terminal a keyword list, including a plurality of variable names which are classified and pre-stored in accordance with the plurality of related documents, and a plurality of keywords which are mapped to the plurality of variable names, respectively when the second user accesses a second keyword area of a second document among the plurality of related documents via the second user terminal, wherein a plurality of users have an authority to generate the plurality of related documents through the platform;

a wireless communication unit configured to wirelessly exchange data with the at least one of the first user terminal and the second user terminal through a network; and a keyword management unit configured to:

extract and parameterize data input into a first keyword area of the at least one keyword area of a first document among the plurality of related documents into a variable name in association with the document creation unit and the document editing unit, automatically input a keyword stored and mapped to the variable name into a target keyword area of the first document among the plurality of related documents when the first user inputs the variable name into the target keyword area via the first user terminal, and automatically input the keyword stored and mapped to the variable name into the second keyword area of the second document among the plurality of related documents when the second user inputs the variable name into the second keyword area via the second user terminal, wherein the keyword that is automatically input into the second keyword area is the data initially input into the first keyword area by the first user via the first user terminal, wherein the first and second documents are related to each other by a clinical trial protocol, wherein the keyword management unit includes a keyword conversion unit, the keyword conversion unit configured to:

parameterize the keyword into the variable name according to at least one variable generation keyword rule, and map and store the keyword and the variable name, classify and store the variable name according to document information of the first document, and classify the plurality of keywords according to a document information and store the keyword list, or generate and store the variable name according to the document information and a keyword rule corresponding to an input keyword, and wherein the document information is for managing a plurality of related documents including the first and second documents.

10. The platform according to claim 9, wherein the keyword management unit includes a rule generation unit configured to generate the at least one variable generation keyword rule to be used in the plurality of related documents.

11. The platform according to claim 10, wherein the rule generation unit is configured to generate and provide at least one variable name generation rule to the at least one of the first user terminal and the second user terminal, and to generate the at least one variable generation keyword rule according to any one variable name generation rule selected by the at least one of the first user terminal and the second user terminal.

12. The platform according to claim 10, wherein the rule generation unit is configured to receive the variable name corresponding to the keyword selected and input by the at least one of the first user and the second user through the at least one of the first user terminal and the second user terminal.

13. The platform according to claim 10, wherein the rule generation unit is configured to receive at least one keyword to be input in the plurality of related documents and the variable name corresponding to the at least one keyword from the at least one of the first user terminal and the second user terminal.

14. The platform of claim 10, wherein the rule generation unit is configured to provide a plurality of keyword display formats to the at least one of the first user terminal and the second user terminal, and request the at least one of the first user terminal and the second user terminal to select at least one among the plurality of keyword display formats, and wherein the plurality of keyword display formats predetermines a format of the keyword displayed on the plurality of related documents when the keyword is input into the at least one keyword area.

15. The platform according to claim 9, wherein the keyword management unit further includes a keyword extraction unit configured to extract the data input into the first keyword area as the keyword and to provide the keyword to the keyword conversion unit.

16. The platform according to claim 9, wherein the keyword management unit further includes a keyword input unit configured to receive, when the variable name is input into the second keyword area by the second user terminal, a keyword call including the variable name from the document creation unit or the document editing unit, and to input the keyword mapped to the variable name into the second keyword area.

17. The platform of claim 9, wherein, when the keyword input into the keyword area is a plurality of words, the keyword extraction unit collectively extracts the plurality of words as a single string of keyword.

18. The platform of claim 9, wherein, when the keyword input into the keyword area is a plurality of words, the keyword extraction unit extracts each word of the plurality of words as a separate individual keyword.

19. A non-transitory computer readable medium in which a software is stored, the software for executing by a computer processor a method comprising:

defining at least one keyword area in a first document, by a platform;

extracting, upon receipt of data from a first user terminal into a first keyword area of the at least one keyword area in the first document, the data as a keyword, by the platform;

generating at least one variable generation keyword rule, by the platform;

parameterizing the keyword into a variable name by mapping the keyword to the variable name according to the at least one variable generation keyword rule, by the platform;

automatically inputting, by the platform, the keyword stored and mapped to the variable name into a target keyword area of the first document when a first user inputs the variable name into the target keyword area via the first user terminal;

providing, by the platform, a keyword list, including a plurality of variable names which are classified and pre-stored in accordance with a plurality of related documents, and a plurality of keywords which are mapped to the plurality of variable names, to a second user terminal when a second user accesses a second keyword area of a second document via the second user terminal, wherein the second document is related to the first document; and automatically inputting, by the platform, the keyword stored and mapped to the variable name into the second keyword area of the second document when the second user inputs the variable name into the second keyword area via the second user terminal, wherein the keyword that is automatically input into the second keyword area is the data initially input into the first keyword area by the first user via the first user terminal, wherein the first user terminal and the second user terminal have an authority to generate the plurality of related documents through the platform, wherein the first and second documents are related to each other by a clinical trial protocol, wherein the platform wirelessly exchanges data with the first and second user terminals through a network, wherein the variable name is classified and stored in the platform according to document information of the first document, wherein the document information is for managing a plurality of related documents including the first and second documents, and wherein the parameterizing the keyword into the variable name by the platform includes:
classifying the plurality of keywords according to a document information and storing the keyword list, or generating and storing the variable name according to the document information and a keyword rule corresponding to an input keyword.

* * * * *